Aug. 4, 1925.　　　　　　　　　　　　　　　1,548,166
G. Y. PETERS
LIQUID MEASURING DEVICE
Filed Dec. 3, 1923
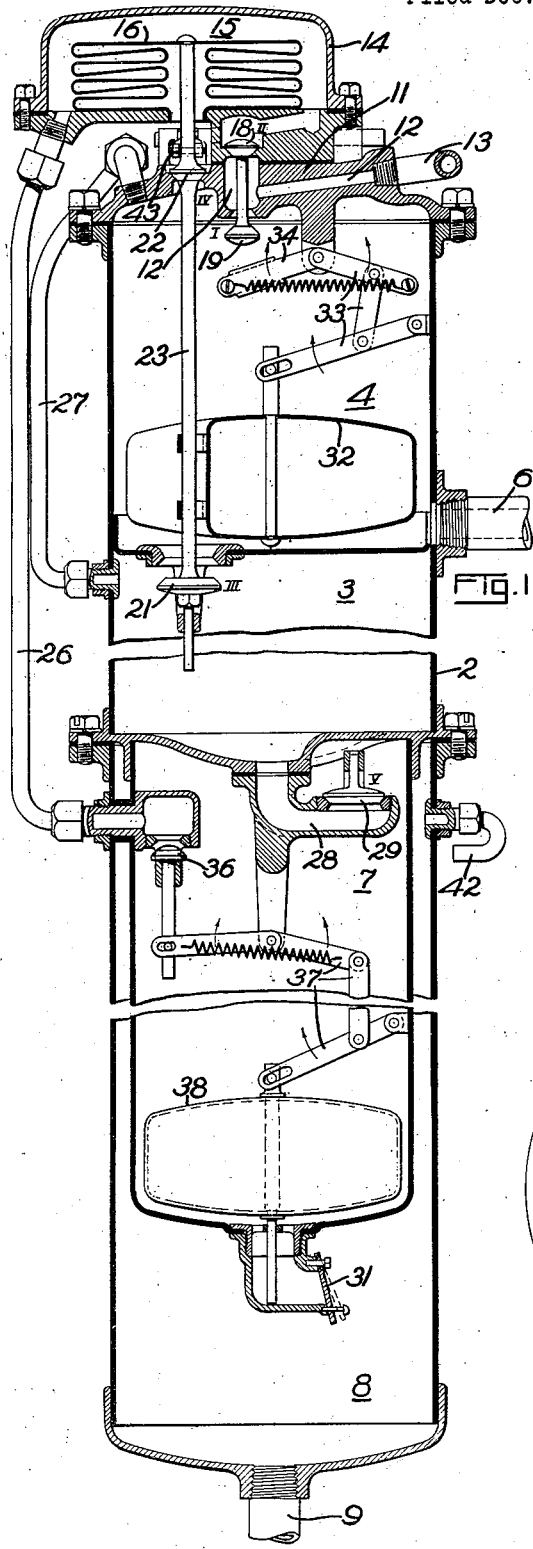
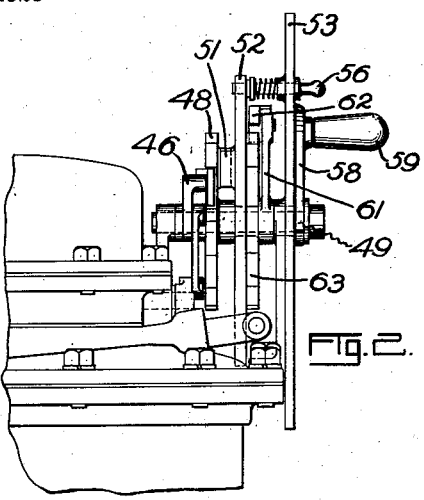
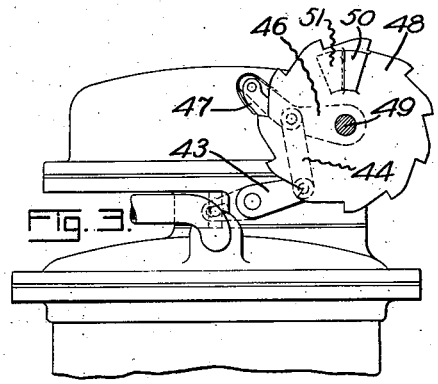
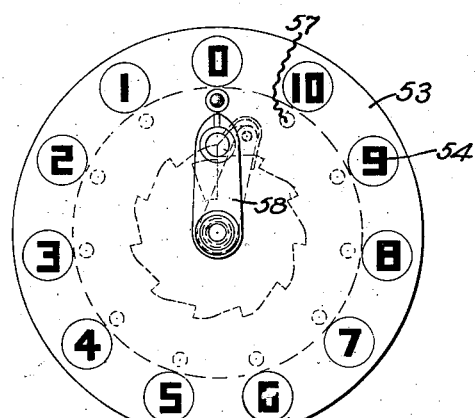
INVENTOR
GEORGE Y. PETERS.
BY White Prost & Evans
HIS ATTORNEYS Patented Aug. 4, 1925.

1,548,166

UNITED STATES PATENT OFFICE.

GEORGE Y. PETERS, OF BERKELEY, CALIFORNIA.

LIQUID-MEASURING DEVICE.

Application filed December 3, 1923. Serial No. 678,103.

*To all whom it may concern:*

Be it known that I, GEORGE Y. PETERS, a citizen of the United States, and a resident of Berkeley, county of Alameda, and State of California, have invented a certain new and useful Liquid-Measuring Device, of which the following is a specification.

My invention relates to measuring or metering devices and one of the objects of the invention is the provision of an apparatus for delivering a predetermined measured quantity of a liquid from a source of supply, each unit volume of the liquid being recorded on an indicating device as it is discharged.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a vertical sectional view thru the device.

Figure 2 is an elevation of an indicating mechanism associated with the measuring device.

Figure 3 is an elevation of a portion of the indicating mechanism. In both Figures 2 and 3, the mechanism is shown mounted on the top of the measuring device.

Figure 4 is an elevation of the dial of the indicating mechanism.

In broad terms, the measuring apparatus of my invention comprises a casing, including a receiving chamber, into which the liquid to be measured flows from the source of supply; a measuring chamber holding a predetermined unit volume of liquid; a discharge chamber into which the liquid from the measuring chamber flows; a diaphragm chamber, one of the walls of which is formed by a diaphragm; and a vacuumized chamber. Valved passages are formed between the measuring chamber and the receiving chamber, between the measuring chamber and the discharge chamber, between the receiving chamber and the open air, between the receiving chamber and the vacuumized chamber, and between the vacuumized chamber and the diaphragm chamber. Float means are provided which operate when the measuring chamber is full of liquid to close certain of the valves and open certain other of the valves, so that the measuring chamber is permitted to fill and empty, alternately. Means are also provided, which may be set to a predetermined quantity of unit volumes to be discharged from the measuring chamber, and when this predetermined number of unit volumes has been discharged, the operation of the device automatically ceases.

In detail, my measuring apparatus comprises a casing or housing 2, enclosing a measuring chamber 3 adapted to hold a unit volume of liquid such as one gallon; a receiving chamber 4, into which the liquid flows thru the conduit 6 from any suitable source of supply; a discharge chamber 7, into which the measuring chamber discharges, and a discharge passage 8, into which the discharge chamber empties and from which the liquid flows thru the pipe 9. The head 11 of the casing is provided with a small chamber 12, connected by the pipe 13 with any suitable vacuumizing means and upon the head of the casing is a housing 14, enclosing the diaphragm chamber 15, one wall of which is formed by the diaphragm 16, the opposite side of which is exposed to atmospheric air.

Suitable passages connect the diaphragm chamber and the receiving chamber to the vacuumized chamber and these passages are controlled by the valves 18 and 19, respectively, preferably arranged on the same valve stem, so that when one of the passages is open, the other one is closed, that is to say, when the valve 18 between the vacuumized chamber and the diaphragm chamber is closed, the valve 19 between the vacuumized chamber and the receiving chamber, is open, and vice versa. Between the receiving chamber and the measuring chamber is a passage controlled by the valve 21, and a passage between the receiving chamber and the open air is controlled by the valve 22. Preferably, these two valves are also arranged on the same valve stem 23, which is extended upwardly into operative engagement with the diaphragm 16. The arrangement of the parts is such that when the valve 22 is closed, the valve 21 is open, and vice versa. A conduit 26 connects the diaphragm chamber with the top of the discharge chamber 7 and a conduit 27 connects the top of the receiving chamber with the top of the measuring chamber. The measuring chamber and the discharge chamber are connected by a passage 28, normally closed by the valve 29, which opens outwardly into the discharge chamber, and the opening of which is augmented by the vacuumizing of the chamber 7, made possible by the conduit 26, connecting the chamber 7 with the diaphragm chamber 15, and the provision of a flap valve 31, which opens outwardly at the bottom of the chamber 7.

When the receiving chamber 4 and the passage 28 are vacuumized the pressure upon the inside of the valve 29 is reduced below the pressure upon the opposite side of the valve. This forces the valve to remain closed under pressure which depends upon the degree of vacuumization applied. The continuation of this closed position of the valve 29 while liquid is filling the measuring chamber 3 is insured by the maintenance of a sufficient degree of vacuumization of chamber 3 to more than offset the unbalanced weight of liquid in the measuring chamber, which is of course balanced in part by the weight of the valve 29.

With the valve 18 closed and the valve 19 open, the vacuumized chamber is in communication with the receiving chamber, which is therefore also vacuumized, and the liquid is drawn into the receiving chamber, discharging past the open valve 21, into the measuring chamber. At this time, the diaphragm is subjected only to atmospheric pressure on both sides and the valve 22 is therefore closed and the valve 21 open. As soon as the measuring chamber is filled, the float 32, operating thru a well-known system of linkage 33, snaps up the lever 34, which impinges upon the valve 19, closing it and opening valve 18. With the opening of valve 18, the diaphragm chamber is vacuumized and the diaphragm 16 lifts valve rod 23, opening the valve 22 and closing valve 21. The chamber 7 is also vacuumized and when this occurs, the valve 29 opens and the liquid in the measuring chamber runs into the discharge chamber, air now flowing thru the open valve 22 into the receiving chamber 4, thus permitting excess liquid therein to drain back thru the conduit 6, and also passing thru the conduit 27 into the top of the measuring chamber, so that it may freely empty. With the last of the liquid in the measuring chamber, air passes thru the passage 28 into the chamber 7, thus relieving the vacuum therein and thru it and the conduit 26, relieving the vacuum in the chamber 15. This equalizes the pressure on the diaphragm and permits the valve stem 23 to fall, closing the valve 22 and again opening the valve 21. With the draining of the surplus liquid out of the receiving chamber, the float 32 falls without opening the valve 19 which is now held closed by the vacuum pull from the vacuumized chamber 12. The float 32 having fallen the valve 19 is permitted to open and the valve 18 to close when the vacuum pull of the vacuumized chamber 12 upon valve 19 is relieved by the inrush of air thru chambers 7 and 15 and thru the open valve 18. When this has taken place the vacuumized chamber is once more in communication with the receiving chamber, whereupon the same cycle of operations is repeated.

Means are provided for blocking the operation of the apparatus, in the event that the liquid in the discharge chamber 7 rises to a predetermined height, so as to interfere with the operation of the valve 29. A valve 36 is arranged to close the passage from the discharge chamber into the conduit 26, and this valve is operated by a linkage 37, actuated by the float 38, in a well-known manner. When the level of the liquid in the discharge chamber 7 rises to a predetermined height, the valve 36 closes, thus preventing the vacuumization of the chamber 7 and the opening of the valve 29. When the level of the liquid in the chamber 7 falls, the valve 36 opens, so that the chamber may be once more vacuumized and the flow of liquid from the measuring chamber into the discharge chamber, continued. A vent pipe 42 admits atmospheric air into the upper portion of the discharge passage 8 so that liquid discharged into this passage flows freely therefrom.

Means are provided for blocking the operation of the device after a predetermined number of unit volumes have been discharged from the measuring chamber. Pivotally mounted in the read 11 of the casing, is a lever 43, pivotally connected at one side to the valve stem 23, and at the other end, connected by the link 44 to the arm 46, carrying the spring pressed pawl 47, adapted to engage the ratchet wheel 48, loose on the shaft 49. Thus with every reciprocation of the valve stem 23, the ratchet wheel 48 is moved forward one step, it being remembered that a reciprocation of the valve stem accompanies the filling and emptying of the measuring chamber. The ratchet 48 is provided with a stop 50, adapted to engage a similar stop 51 on the disk 52, also loosely mounted on the shaft 49. The shaft 49 passes thru a fixed dial 53 on which are arranged numbers 54 and thru which a spring pressed pin 56 passes into engagement with the disk 52, which is provided with a series of circumferentially spaced apertures 57, adapted to receive the end of the pin. Fixed on the shaft 49 on the outside of the dial is a pointer 58, controlled by the handle 59, and fixed on the inside of the dial on the shaft is the arm 61 provided with the pawl 62, adapted to engage a series of ratchet teeth 63 fixed on the disk 52.

By pulling out the spring pressed pin 56, the pointer 58 may be moved to any selected number 54, indicating the number of unit volumes which it is desired to have the measuring apparatus deliver. Movement of the pointer 58 is accompanied by similar movement of the lever arm 61, and a corresponding movement of the disk 52, which may then be locked in position by letting in the pin 56. With the delivery of each unit volume of liquid from the apparatus, the ratchet 48 is moved forward one step, until the stop 50 engages the stop 51 and further movement of the ratchet and lever 43 is prevented, thus blocking movement of the valve rod 23, and preventing a further operation of the device. The use of the pawl 62 on the ratchet 63 makes it possible to return the pointer 58 to zero, after each operation of the measuring apparatus. With a subsequent movement of the pointer to a new number 54, the movement of the disk 52 is cumulative, that is, the disk 52 is moved forward an amount corresponding to the new setting of the pointer, which of course, sets the stop 51 a corresponding distance ahead of the stop 50, so that when a step by step movement of the ratchet 48 brings the stop 50 against the stop 51, further action is blocked, as before.

From the above it will be seen that with the movement of the pointer 58 from the zero setting, the valve stem 23 is released, and the operation of the device begins, the measuring chamber filling and emptying alternately and automatically until the valve stem 23 is again blocked after the predetermined number of unit volumes has passed thru the measuring chamber, corresponding to the setting of the disk 52.

I claim:

1. A measuring apparatus comprising a measuring chamber adapted to hold a unit volume of liquid, a receiving chamber adapted to receive the liquid from a source of supply, a discharge chamber adapted to receive the liquid from the measuring chamber, a passage between the discharge and vacuumized chambers, a vacuumized chamber, a valve (I) between the vacuumized chamber and the receiving chamber, a valve (II) in said passage between the vacuumized chamber and the discharge chamber, a valve (III) between the receiving chamber and the measuring chamber, a valve (IV) between the receiving chamber and the atmosphere, a float for closing said valve (I) and opening said valve (II) when the measuring chamber is full, and means the operation of which is initiated by the opening of said valve (II) for closing said valve (III) and opening said valve (IV).

2. A liquid measuring apparatus comprising a receiving chamber, a diaphragm chamber having one of its walls formed by a diaphragm, a vacuumized chamber, a measuring chamber, a discharge chamber in communication with said diaphragm chamber, a valve (I) between the vacuumized and receiving chambers, a valve (II) between the vacuumized and diaphragm chambers, a valve (III) between the receiving and measuring chambers, a valve (IV) between the receiving chamber and the atmosphere, said valves (III) and (IV) being connected to said diaphragm, a passage between the upper portions of the measuring and receiving chambers, a valve (V) between the measuring and discharge chambers adapted to open upon vacuumizing the discharge chamber, and means for automatically closing valve (I) and opening valve (II) when the measuring chamber is full whereby valve (III) is closed and valve (IV) is opened by movement of the diaphragm to effect the flow of liquid from the measuring chamber to the discharge chamber.

3. A liquid measuring apparatus comprising a receiving chamber, a diaphragm chamber having one of its walls formed by a diaphragm, a vacuumized chamber, a measuring chamber, a discharge chamber in communication with said diaphragm chamber, a valve (I) between the vacuumized and receiving chambers, a valve (II) between the vacuumized and diaphragm chambers, a valve (III) between the receiving and measuring chambers, a valve (IV) between the receiving chamber and the atmosphere, said valves (III) and (IV) being connected to said diaphragm, a passage between the upper portions of the measuring and receiving chambers, a valve (V) between the measuring and discharge chambers adapted to open upon vacuumizing the discharge chamber, means for automatically closing valve (I) and opening valve (II) when the measuring chamber is full whereby valve (III) is closed and valve (IV) is opened by movement of the diaphragm to effect the flow of liquid from the measuring chamber to the discharge chamber, and means for blocking the operation of valves (III) and (IV) after a predetermined number of loads have been emptied from the measuring chamber.

4. A liquid measuring apparatus comprising a receiving chamber, a diaphragm chamber having one of its walls formed by a diaphragm, a vacuumized chamber, a measuring chamber, a discharge chamber in communication with said diaphragm chamber, a valve (I) between the vacuumized and receiving chambers, a valve (II) between the vacuumized and diaphragm chambers, a valve (III) between the receiving and measuring chambers, a valve (IV) between the receiving chamber and the atmosphere, said valves (III) and (IV) being connected to said diaphragm, a passage between the upper portions of the measuring and receiving chambers, a valve (V) between the measuring and discharge chambers adapted to open upon vacuumizing the discharge chamber, means for automatically closing valve (I) and opening valve (II) when the measuring chamber is full whereby valve (III) is closed and valve (IV) is opened by movement of the diaphragm to effect the flow of liquid from the measuring chamber to the discharge chamber, and a float controlled valve for closing communication between the diaphragm and discharge chambers when the liquid in the discharge chamber exceeds a predetermined quantity.

5. A liquid measuring apparatus comprising a receiving chamber, a diaphragm chamber having one of its walls formed by a diaphragm, a vacuumized chamber, a measuring chamber, a discharge chamber in communication with said diaphragm chamber, a valve (I) between the vacuumized and receiving chambers, a valve (II) between the vacuumized and diaphragm chambers, a valve (III) between the receiving and measuring chambers, a valve (IV) between the receiving chamber and the atmosphere, said valves (III) and (IV) being connected to said diaphragm, a passage between the upper portions of the measuring and receiving chambers, a valve (V) between the measuring and discharge chambers adapted to open upon vacuumizing the discharge chamber, means for automatically closing valve (I) and opening valve (II) when the measuring chamber is full whereby valve (III) is closed and valve (IV) is opened by movement of the diaphragm to effect the flow of liquid from the measuring chamber to the discharge chamber, and means operatively connected to said diaphragm for indicating the number of loads of liquid passed thru the measuring chamber.

6. A liquid measuring apparatus comprising a receiving chamber, a diaphragm chamber having one of its walls formed by a diaphragm, a vacuumized chamber, a measuring chamber, a discharge chamber in communication with said diaphragm chamber, a valve (I) between the vacuumized and receiving chambers, a valve (II) between the vacuumized and diaphragm chambers, a valve (III) between the receiving and measuring chambers, a valve (IV) between the receiving chamber and the atmosphere, said valves (III) and (IV) being connected to said diaphragm, a passage between the upper portions of the measuring and receiving chambers, a valve (V) between the measuring and discharge chambers adapted to open upon vacuumizing the discharge chamber, means for automatically closing valve (I) and opening valve (II) when the measuring chamber is full whereby valve (III) is closed and valve (IV) is opened by movement of the diaphragm to effect the flow of liquid from the measuring chamber to the discharge chamber, and an outwardly opening flap valve in the lower portion of said discharge chamber.

In testimony whereof, I have hereunto set my hand.

GEORGE Y. PETERS.